MATRIX LOGIC COMPUTER
Filed Dec. 4, 1962
6 Sheets-Sheet 1
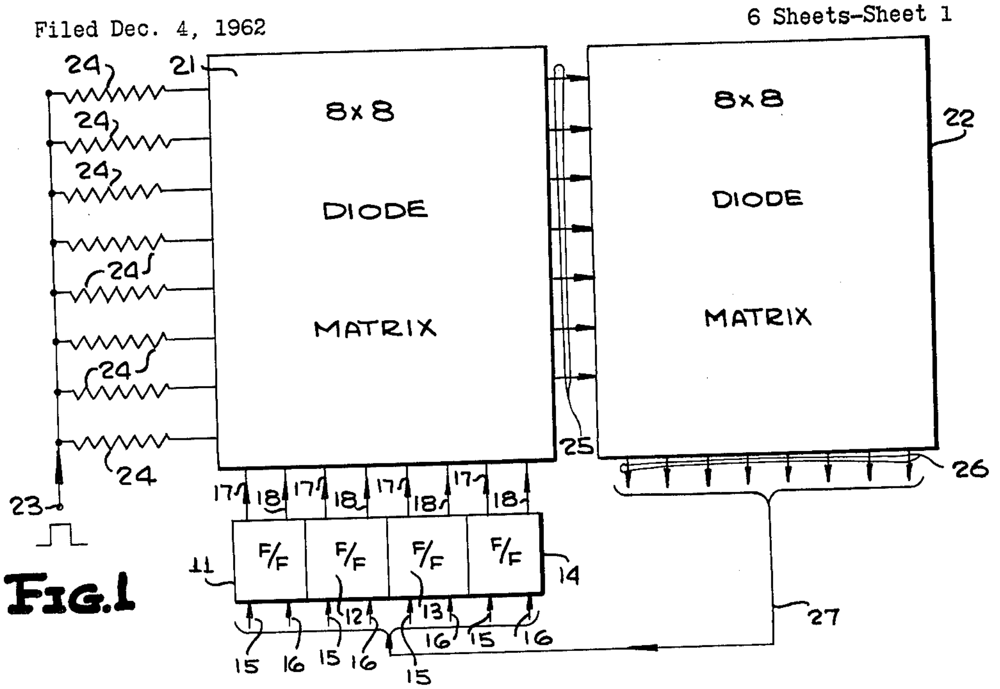
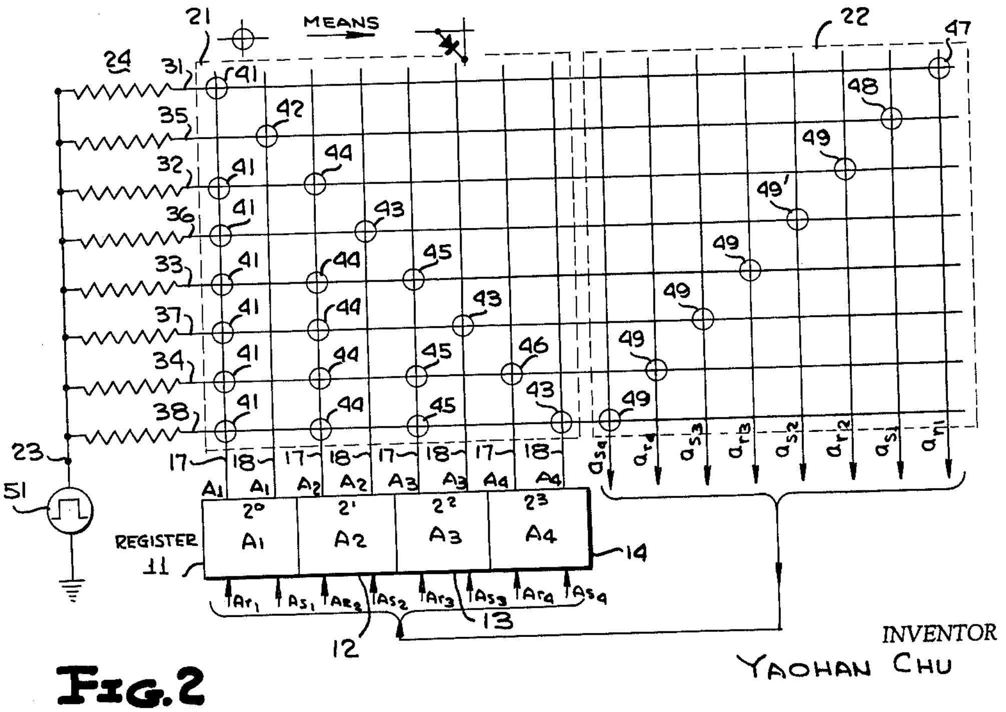
FIG. 2
INVENTOR
YAOHAN CHU
BY Hurvitz & Rose
ATTORNEYS

MATRIX LOGIC COMPUTER

Filed Dec. 4, 1962 6 Sheets-Sheet 2

INVENTOR

YAOHAN CHU

BY

ATTORNEYS

Jan. 18, 1966 YAOHAN CHU 3,230,355

MATRIX LOGIC COMPUTER

Filed Dec. 4, 1962 6 Sheets-Sheet 3

INVENTOR
YAOHAN CHU

BY Hurvitz & Rose

ATTORNEYS

INVENTOR
YAOHAN CHU
BY Hurvitz & Rose
ATTORNEYS

MATRIX LOGIC COMPUTER

Filed Dec. 4, 1962 6 Sheets-Sheet 5

INVENTOR
YAOHAN CHU

BY Hurvitz & Rose
ATTORNEYS

INVENTOR
YAOHAN CHU

BY Hurwitz & Rose
ATTORNEYS 3,230,355
MATRIX LOGIC COMPUTER
Yaohan Chu, Chevy Chase, Md., assignor to Melpar, Inc., Falls Church, Va., a corporation of Delaware
Filed Dec. 4, 1962, Ser. No. 242,127
35 Claims. (Cl. 235—168)

The present invention relates generally to computers and more particularly to a computer employing logical switching matrices which are coupled between the inputs and outputs of bistable elements, which devices are particularly adapted to micro-electronic circuitry.

With the advent of micro-electronic circuitry, e.g. solid state molecular components and thin films, the possibility of designing large computers which require minimum space has seemingly been realized. However, existing computer techniques have not achieved the desired results because they have lacked the flexibility necessary for ease of substitution of components. Also prior techniques present difficulties because simple and repetitive circuit configurations are not easily evolved, connections between elements are arduous to initially design and establish, and detection and location of circuit malfunction are not easily accomplished.

The present invention avoids these difficulties of the prior art by employing a system which includes an array of bistable elements and a switching matrix. Each bistable element has a pair of complementary inputs which are responsive to signals coupled through the matrix and a pair of complementary outputs which control the matrix signals. A plurality of bistable elements are positioned on a micro-electronic circuit board in a fixed predetermined regular manner so that they are each alike. Each switch matrix includes a plurality of like, orthogonally arranged conductors. A diode switch is positioned between selected conductors in accordance with the predetermined function to be performed, e.g. counting, complementing and pulse shifting.

To obtain a signal commensurate with a predetermined function it is merely necessary to connect the appropriate switch matrix to one of the bistable arrays. In this manner, complex computer programs are obtained merely by interconnecting a plurality of circuit boards containing different switch matrices with a number of circuit boards containing the bistable arrays. If a malfunction occurs or a change in the program occurs, it is then merely necessary to change the appropriate boards.

The entire computer includes a multi-word memory, a buffer register, and an accumulator register which are selectively interconnected under the control of a programmer. The programmer is in essence a counter having a plurality of different sequences, dependent on the instruction coupled to it. The programmer selectively connects the memory and the registers to each other, and controls the flow of instructions to itself. Selective connections are made between the various elements to effect addition, subtraction, shifting, etc.

It is, accordingly, an object of the present invention to provide a new and improved computer particularly adapted for micro-electronic circuitry.

It is another object of the present invention to provide new and improved computer utilizing matrix switching logic.

A further object of the present invention is to provide new and improved computer utilizing circuit boards having similarly arranged topographical conductors, wherein different binary functions are obtained by properly locating switching diodes between the conductors.

An additional object of the present invention is to provide a computer adapted particularly for use with micro-electronic elements wherein interconnections between the various circuit boards are reduced to a minimum and those necessary are easily established.

Still another object of the present invention is to provide a computer which utilizes micro-electronic circuit boards that are easily removed for repair, replacement, and flexibility when a program change is desired.

Yet a further object of the present invention is to provide a computer utilizing micro-electronic circuit boards which are relatively inexpensive due to their topographcal layout smplicity and similarity, even for different functions.

A still further object of the present invention is to provide a new and improved computer which is of minimum size, and weight, and consumes small amounts of power due to the deployment of micro-electronic elements.

The above and still further objects, features and advantages of the present invention will become apparent upon consideration of the following detailed description of one specific embodiment thereof, especially when taken in conjunction with the accompanying drawings, wherein:

FIGURE 1 is a block diagram disclosing the concept of the present invention;

FIGURE 2 is a circuit diagram of one embodiment of the present invention utilized as a counting network;

Figures 8, 10:
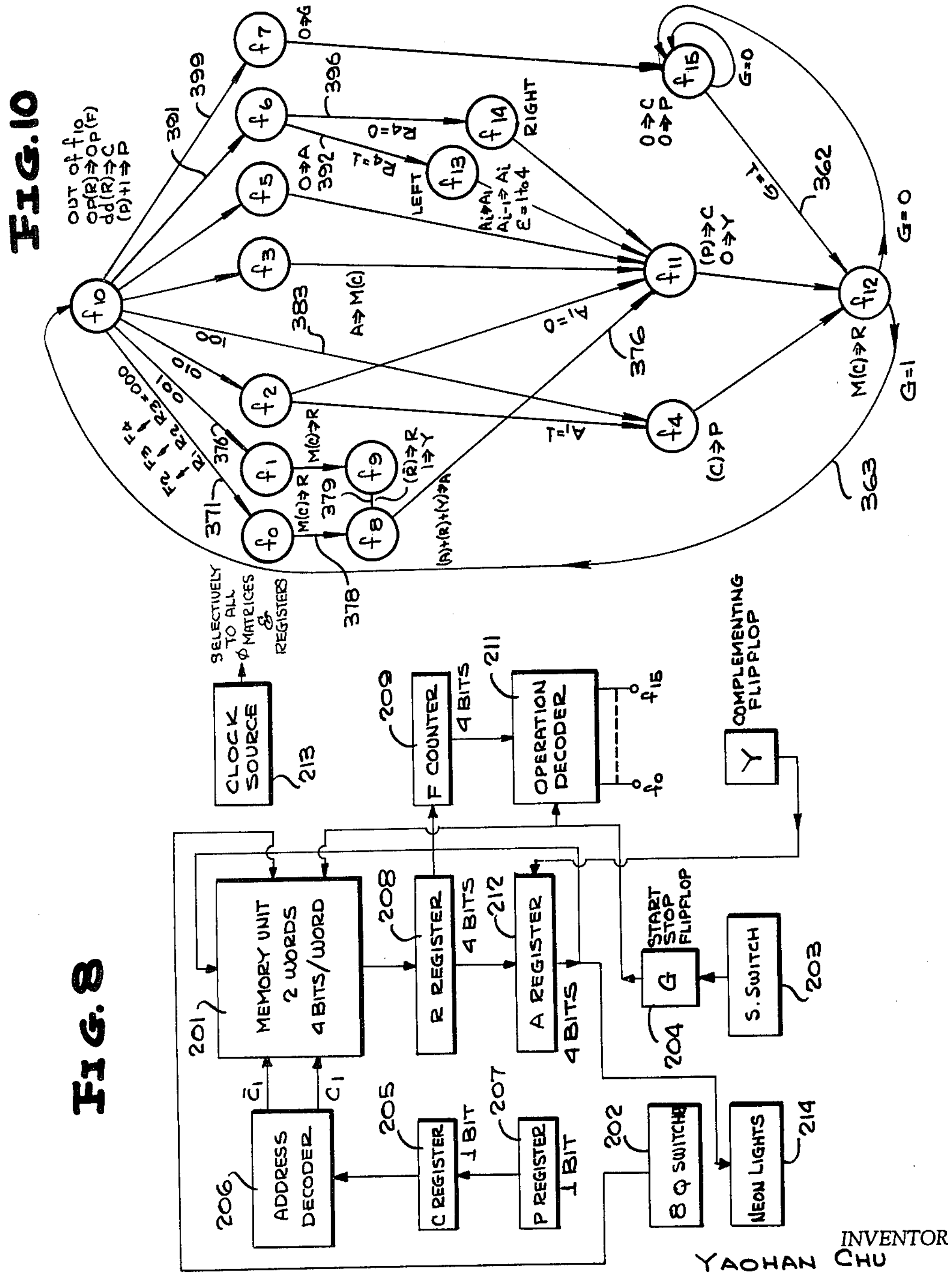
FIGURE 8 is a block diagram of a complete computer employing matrix units as illustrated in FIGURES 2–4.
Figure 9A:
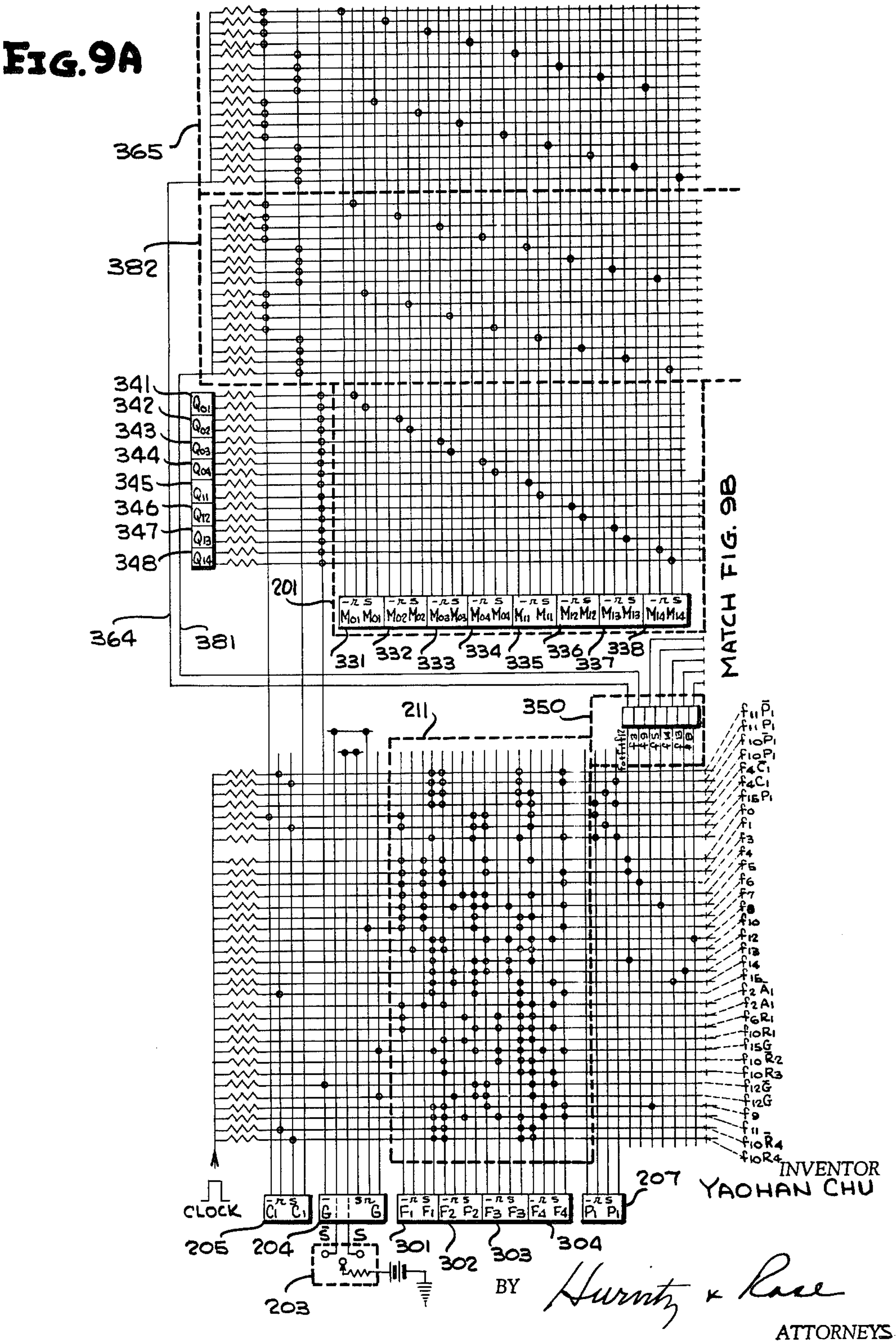
Figure 9B:
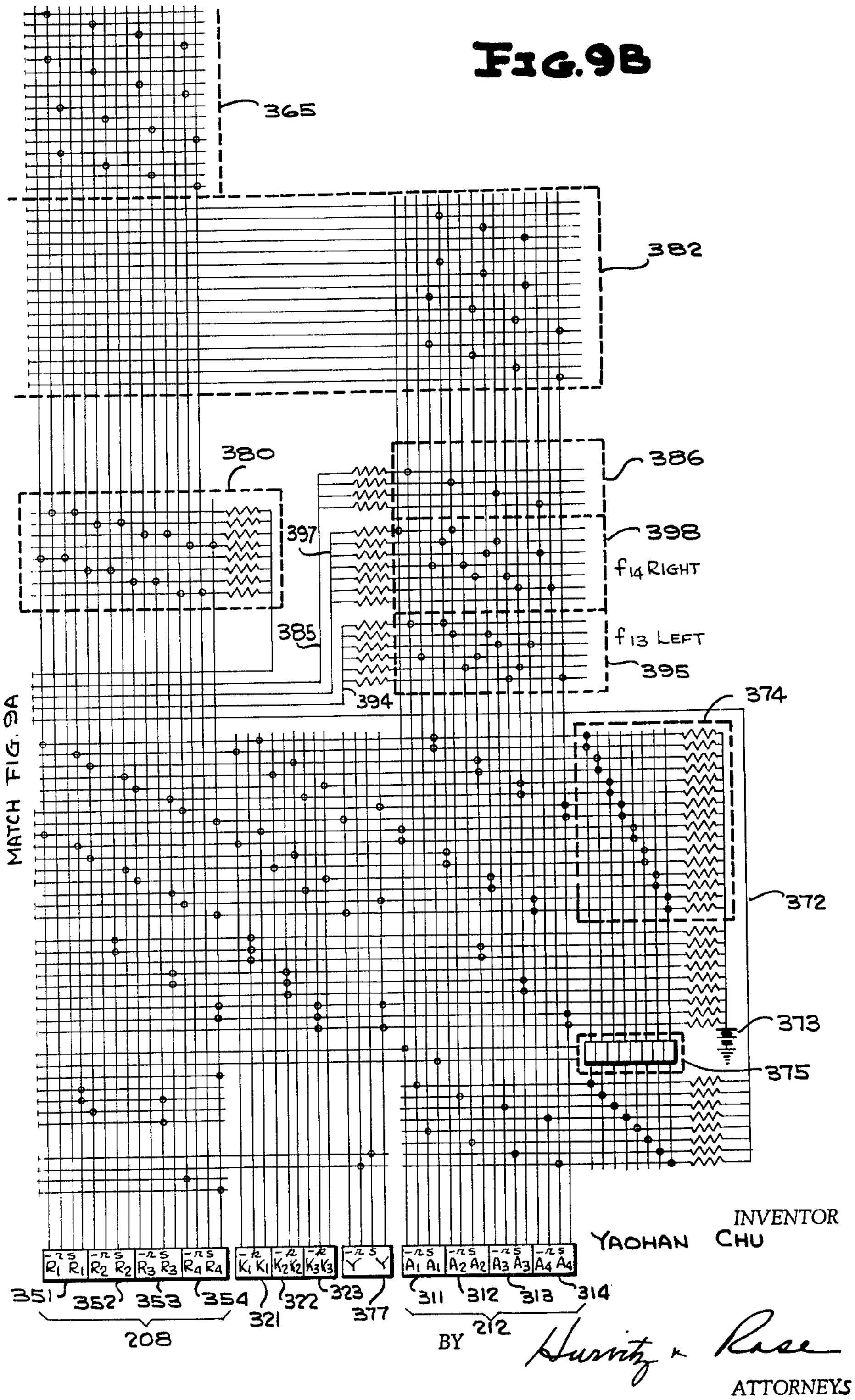

FIGURES 9*a* and 9*b*, together, are a schematic diagram of the computer of FIGURE 8; and FIGURE 10 is a state diagram of the computer of FIGURE 9.

Reference is now made to FIGURE 1 of the drawings, upon which is illustrated four flip-flops 11–14 having outputs represeting $2^0$, $2^1$, $2^2$ and $2^3$. Each of the flip-flops 11–14 includes a pair of complementary inputs 15 and 16 and a pair of complementary outputs 17 and 18. When an input is applied on one of the leads 15 of flip-flops 11–14, the respective flip-flop is energized to a binary one state while it is energized to a binary zero state when a signal is applied on the lead 16. In response to the respective flip-flop being in a binary one state, an output signal is derived on lead 17 while no output signal is derived on lead 18. In an opposite manner, output leads 17 and 18 of flip-flops 11–14 carry binary one and zero signals when their respective flip-flops are energized to a binary zero state.

The input and output leads of flip-flops 11–14 are connected to each other via a switching network which includes a pair of 8 x 8 diode matrices 21 and 22. Matrix 21 contains eight vertical inputs, i.e. column leads, which are connected to the output leads of flip-flops 11–14. A control pulse is applied to terminal 23 and hence in parallel to each of the horizontal leads or rows of matrix 21 via current limiting resistors 24. The current flow between terminal 23 and the output leads 25 of matrix 21 is controlled by the states of flip-flops 11–14. The output currents of matrix 21 are therefore selectively applied to the horizontal input leads of matrix 22.

Matrix 22 includes eight separate output leads which are selectively connected to leads 25 in acordance with the function which the system is designed to derive. The vertical or column outputs of diode matrix 22 on leads 26 are applied via cable 27 to the respective inputs of flip-flops 11–14. The signals coupled to the input terminals of flip-flops 11–14 set or reset the flip-flops to a binary zero or one state in accordance with the desired mode of operation.

Figure 3:
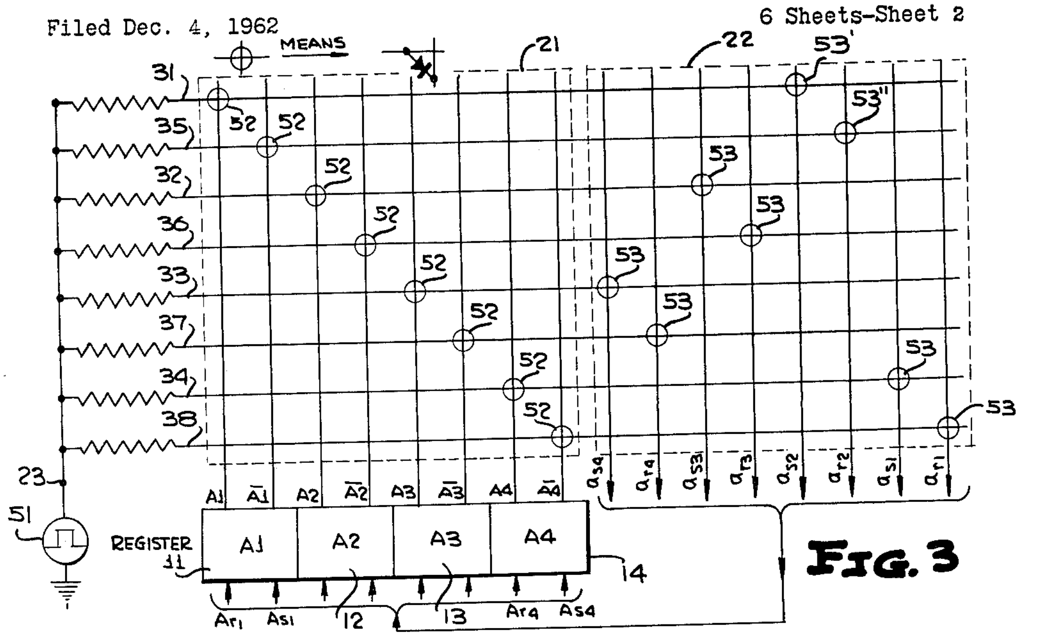
FIGURE 3 is another embodiment of the present invention utilized as a shift register network.
Figure 4:
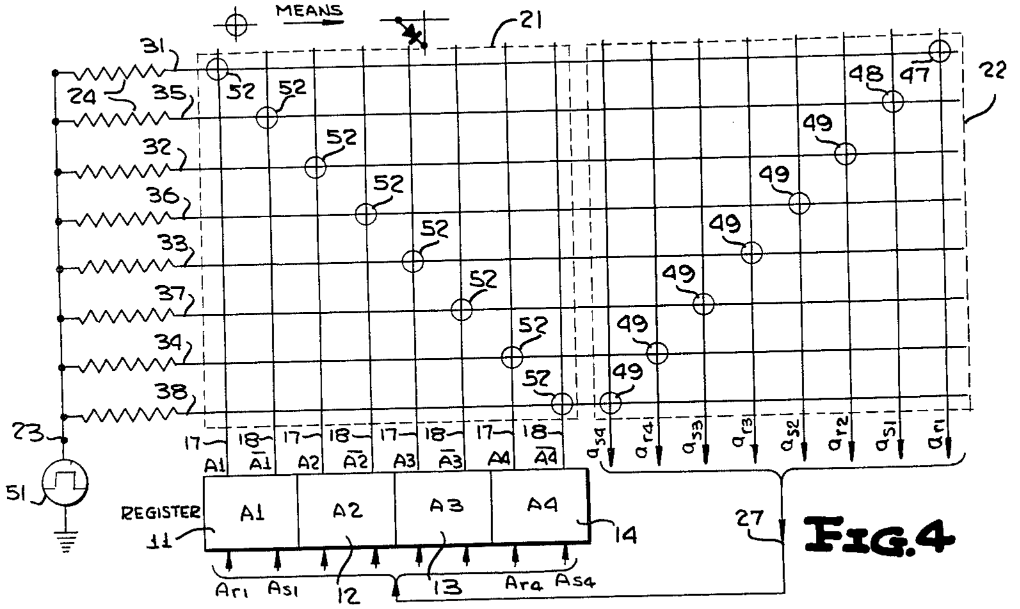
FIGURE 4 is a further embodiment of the present invention utilized as a complementary network.

Reference is now made to FIGURE 2 of the drawings which discloses a specific arrangement of the flip-flops and diode matrices utilized for binary counting. In this figure as well as in FIGURES 3, 4, and 6, each of the circles located at an intersection of a horizontal and vertical lead indicates the presence of a diode, as shown at the top of FIGURES 2, 3 and 4. Each circle indicates that the anode of a particular diode is connected to a horizontal lead while the cathode thereof is connected to a vertical lead.

In the circuits of FIGURES 2–4 and in the claims, each of the horizontal leads is designated as a binary zero or one of a respective flip-flop order. Thus, leads 31–34 represent the binary one state of the flip-flops 11–14, while leads 35–38 represent the binary zero states of these flip-flops, respectively. The vertical leads 17 and 18 connected to the outputs of flip-flops 11–14 are designated in accordance with the zero or binary one state of the flip-flop with which they are associated. In a similar manner, the vertical leads coupled to the inputs of flip-flops 11–14 are denominated as the binary zero and one column inputs for their respective flip-flops.

Diodes 41 are connected to the binary one output of flip-flop 11 so that they connect with each of the leads 31–38, except lead 35, which is connected via diode 42 to the binary zero output of flip-flop 11. Each of the binary zero outputs of flip-flops 12–14 is connected to its respective zero order row 36, 37, and 38 via diodes 43. The binary one output of flip-flop 12 is connected to leads 32, 33, 34, 37 and 38 via diodes 44; the one output lead of flip-flop 13 is connected to leads 33, 34 and 38 via diodes 45; and the one output of flip-flop 14 is connected to lead 34 via diodes 46.

The diodes in matrix 22 are connected to the oppositely designated inputs of their respective flip-flops. Thereby, lead 31, designated as the binary one output of zero order flip-flop 11, is connected via diode 47 to the reset of binary zero input of flip-flop 11 and diode 48 is connected between lead 35 and the set or binary one input of flip-flop 11. Similarly, the remaining diodes 49 in matrix 22 are connected between each of the leads 32–38, except lead 35, to their corresponding reset and set inputs of flip-flops 12–14.

Generalizing, it is assumed that N flip-flops and a matrix having a total of 4N columns and 2N rows are provided. The N flip-flops represent the zero through $N-1$ binary orders of the number to be counted. Each of the matrix rows is designated as a binary zero or one of a respective flip-flop order and each of the columns is designated as a zero or one of the inputs or outputs of a respective flip-flop order.

A diode switch is connected between the column connected to the binary zero output of the Kth order flip-flop and the row designated as the zero of the Kth order flip-flop, where K is any integer less than N, i.e. any integer between zero and $(N-1)$. A further diode switch is connected between the column connected to the binary one output of the Ith order flip-flop and each of the rows designated as the binary one of the Ith through $(N-1)$th order flip-flops. A similar switch is connected between this column and each of the rows designated as the binary zero of the $(I+1)$ through $(N-1)$ order flip-flops.

In the specific configuration of FIGURE 2, the binary one output of flip-flop 11 on lead 17 is connected to each of the binary one rows 31–34 of the zero, first, second, and third order flip-flops 11–14. This same output of flip-flop 11 is connected to the binary zero rows 36–38 associated with the binary zero outputs of the first, second, and third order flip-flops 12–14. The binary zero output of flip-flop 11 is connected only to the lead 35, designated as the binary zero order of the zero order flip-flop.

The connections of the diodes 47–49 between leads 31–38 and the input leads of flip-flops 11–14 may be considered as connections between the column connected to the binary zero input of the Lth order flip-flop and the row designated as the binary one of the Lth order flip-flop for the leads 31–34. For leads 35–38, the zero order input of the Gth order flip-flop is connected to the row designated as the binary one of the Gth order flip-flop.

In operation, each of the flip flops 11–14 is initially set to a binary zero state so that a positive voltage greater than that of a pulse derived from source 51 is generated on each of the binary zero output leads 18. The voltage on each of the binary one leads 17 is less than that developed by pulse source 51 so that when the first positive pulse is generated by source 51, the voltage on each of the horizontal leads, except lead 35, is limited to the output voltage on lead 17 of flip flop 11. In consequence, the current applied by source 51 to each of the leads 31–38, except lead 35, is diverted to lead 17 of flip flop 11. The current on lead 35 is not diverted because the cathode of diode 42 is maintained at a higher potential than the voltage of source 51 so that a positive signal is coupled via lead 35 to the anode of diode 48 but to none of the other diodes in matrix 22.

The positive signal applied to the anode of diode 48 is coupled to the set input terminal of flip flop 11 so that this flip flop is set to a binary one state. Each of the other flip flops remains in the binary zero state since no signals are coupled thereto through diodes 49.

In response to the second pulse from source 51, the current on lead 35 is limited due to the low voltage now applied to the output lead 18 of flip flop 11. The large voltage on output lead 17 of flip flop 11 does not affect the pulse from source 51 since it is of too great a magnitude to permit conduction through diodes 41. The binary one output 17 of flip flop 12 is maintained at a low value to limit the voltage on leads 32–34 and 37 and 38 to a low value. However, the current on lead 36 is not conducted through diode 43 and hence proceeds to the anode of diode 49′. The positive current applied to diode 49′ is coupled to the set input terminal of flip flop 12 to cause it to switch from a binary zero to one state. At the same time, a positive voltage is applied to the reset input of flip flop 11 via diode 47 so that it is returned to the binary zero state. In consequence, flip flop 12 is set in a binary one state while each of the other flip flops is maintained in a binary zero state.

An indication of the status of each of the flip flops is obtained by monitoring the voltage on the respective leads 17 and 18 thereof.

It should now be apparent that in response to the third input pulse, flip flops 11 and 12 are driven to the binary one state and flip flops 13 and 14 are maintained in the zero state by the correct activation of diodes 47, 48 and 49. In response to the fourth pulse from source 51, flip flop 13 is activated into a binary one state and each of the other flip flops 11, 12, and 14 is maintained in a binary zero. The operation of the switching matrix in combination with the flip flop is now believed apparent so that further description of the current flow through the matrices is not believed necessary.

Reference is now made to FIGURE 3 of the drawings which discloses the matrix construction for a shift register type circuit. In FIGURE 3, the connections of output leads 17 and 18 of flip flops 11–14 and the input connections from matrix 22 to flip flops 11–14 are exactly the same as in the circuit of FIGURE 2. However, the internal matrix construction is different in that only a single diode is connected between each of the horizontal leads 31–38 and each of the output leads 17 and 18 of flip flops 11–14. Similarly, a single diode is connected between each of the set and reset inputs of flip flops 11–14 and the horizontal leads 31–38.

The diode switches are arranged so that the binary one output of each of the flip flops 11 is connected to the corresponding binary one lead 31–34 and the binary zero outputs of flip flops 11–14 are connected to the binary zero leads 35–38. The diodes in matrix 22 are arranged so that the respective binary one lead is connected to succeeding binary one input lead of flip flops 11–14. Thus, diode 53′ is connected between the binary one lead 31 associated with flip flop 11 and the binary one or set lead associated with flip flop 12. Diode 53″ is connected between the binary zero lead 35 associated with flip flop 11 and the reset or binary zero input of flip flop 12.

Generalizing, the binary zero and one outputs of each of the binary ordered flip flops 11–14 is connected to its respective binary zero and one horizontal lead 31–38. The binary zero and one horizontal leads associated with the Gth order flip flop are connected to the binary one and zero inputs of the $(G+1)$th order flip flop. In this generalization it is assumed that the Nth order flip flop is the zero order flip flop.

In operation, flip flop 11 is initially preloaded to a binary one state by appropriate circuitry and each of the other flip flops 12–14 is maintained in a binary zero state. In consequence, the binary one output lead 17 of flip flop 11 is maintained at a high potential while lead 18 thereof is maintained at a low potential. The output leads 17 and 18 of each of the other flip flops 12–14 are maintained in opposite conditions.

In response to the first input pulse applied to terminal 23, a relatively large current is derived on lead 31 to the right of diode 52 while a relatively small current is derived on lead 35 to the right of diode 52. Due to the states of flip flops 12–14, leads 36, 37 and 38 carry relatively large currents to the right side of their respective diodes 52 while leads 32–34 carry relatively small currents. In consequence, a pulse is supplied to the set or binary one input of flip flop 12 and to the reset or binary zero inputs of flip flops 11, 13 and 14. In response to these pulses, flip flop 12 is driven to the binary one state and flip flop 11 is returned to the binary zero state. Flip flops 13 and 14 remain in their binary zero state since the same inputs are activated which had previously been activated. Thus, after the first pulse has been generated, the output lead 17 of flip flop 12 is maintained at a large voltage as is each of the binary zero output leads 18 of flip flops 11, 13 and 14. The binary one output leads of flip flops 11, 13 and 14 are maintained at a low voltage level as is the binary one output 18 of flip flop 12.

In response to the second pulse from source 51, a voltage is coupled to the right side of diode 52 on lead 32 to diode 53. At the same time, pulses are applied to the right sides of diodes 52 which are connected to leads 35, 37, and 38. As a result, pulses are supplied to the set input of flip flop 13 and to the reset inputs of flip flops 11, 12 and 14. In consequence, flip flop 13 is set in a binary one state and each of the flip flops 11, 12 and 14 is set to the binary zero state.

In should be apparent that the shift register action continues in response to successively derived pulses from source 51. In response to the fifth pulse, the system operates in the same manner as a ring counter since the signal on lead 34 is coupled to the set or binary one input of flip flop 11.

Reference is now made to FIGURE 4 of the drawings which discloses an arrangement of matrices 21 and 22 for deriving an indication of the complementary state of flip flops 11–14. The connections of the diodes 52 in matrix 21 to the output terminals of flip flops 11–14 are exactly the same as in the shift register matrix of FIGURE 3 while the connections of the diodes in matrix 22 to the flip-flop input terminals and the horizontal conductors of the matrix are exactly the same as in the matrix 22 of FIGURE 2.

To provide an indication of the manner in which the apparatus of FIGURE 4 functions, it is assumed that only flip flops 11 and 13 are in a binary one state. In consequence, the binary one outputs 17 and 18 of flip flops 11 and 13 and the binary zero outputs of flip flops 12 and 14 are maintained at large positve values. Accordingly, the other outputs of flip flops 11–14 are driven to a low value.

In response to a positive pulse at terminal 23, a pulse is coupled to the right side of diodes 52 on leads 31, 33, 36, and 38. The remaining horizontal leads have no pulses coupled thereto on the right side of diodes 52 due to the blocking action of the low voltage on the vertical leads connected thereto. In consequence, control voltages are generated on the reset input leads of flip flops 11 and 13 as well as on the set input leads of flip flops 12 and 14 to drive flip flops 11 and 13 to their binary zero states and flips flops 12 and 14 to the binary one states.

Thus, to derive an output commensurate with the complement of a particular signal, it is merely necessary to correctly load the desired flip flop stage with a binary one and apply a single pulse to terminal 23 from source 51. The complementary output is derived on the appropriate leads 17 and 18 of flip flops 11–14.

In general, for each matrix configuration each horizontal lead and the diodes associated with it constitute a shunt type AND gate while each of the vertical set and reset leads and the diode or diodes associated therewith constitute a series type OR gate.

Figure 5:
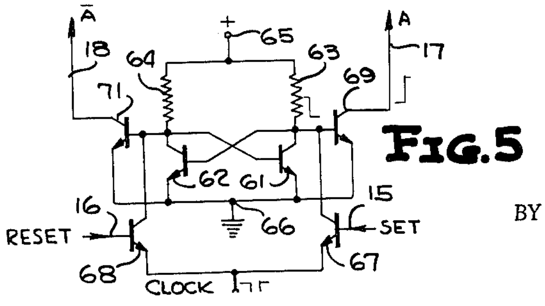
FIGURE 5 is a circuit diagram of a preferred form of flip-flop circuit utilized in the present invention.

Reference is now made to FIGURE 5 of the drawings which discloses a preferred circuit which is utilized for flip flops 11–14 in FIGURES 1–4. The flip flop circuit includes the basic cross connected pair of N-P-N transistors 61 and 62 which have their collectors connected through resistors 63 and 64, respectively, to positive biasing terminals 65. The collector of transistor 61 is directly connected to the base of transistor 62, the collector of which is directly connected to the base of transistor 61. The emitters of transistors 61 and 62 are directly connected to ground 66.

Each of the transistors 61 and 62 is collector driven by N-P-N transistors 67 and 68, respectively. The collectors of transistors 67 and 68 are connected to the collectors of transistors 61 and 62 so that a large positive input voltage to the base of transistors 67 or 68 results in a drop in potential at the collector of transistor 61 or 62, respectively. The emitters of transistors 67 and 68 are connected together and to a source of negative clock pulses which are simultaneously applied to each of the flip flops. In the preferred embodiment, these clock pulses function to activate the flip-flops change of states and terminal 23, FIGURES 2–4, is maintained at a constant, positive potential. The voltage variations at the collectors of transistors 61 and 62 are coupled via amplifying transistors 69 and 71 to output leads 17 and 18, respectively. Leads 17 and 18 supply the positive output voltages at the collectors of transistors 61 and 62 to the vertical input leads of diode matrix 21. There is no need for an external biasing source for the collectors of transistors 69 and 71 due to the presence of the positive voltage source which is coupled to leads 17 and 18 via terminal 23.

In operation, the application of a clock pulse to the emitters of transistors 67 and 68 with a positive voltage applied to set lead 15, causes transistor 67 to conduct heavily, thereby lowering the collector voltage of transistor 61 due to the increased flow of current through resistor 63. In response to a lower voltage at the collector of transistor 61, the base of transistor 62 is biased to cut off in accordance with the well known flip flop type operation. With collector current flowing in transistor 61, transistor 69 is driven towards cut-off resulting in an increased positive voltage on lead 17. Lead 17 is maintained at this level until the simultaneous occurrence of a reset pulse on lead 16 and a clock pulse. In consequence, lead 17 applies a positive voltage to the diode matrix until the flip flop is reset by a positive voltage coupled to lead 16 from diode matrix 22 at the same that a clock pulse is applied to the emitters of transistors 67 and 68.

Figure 6:
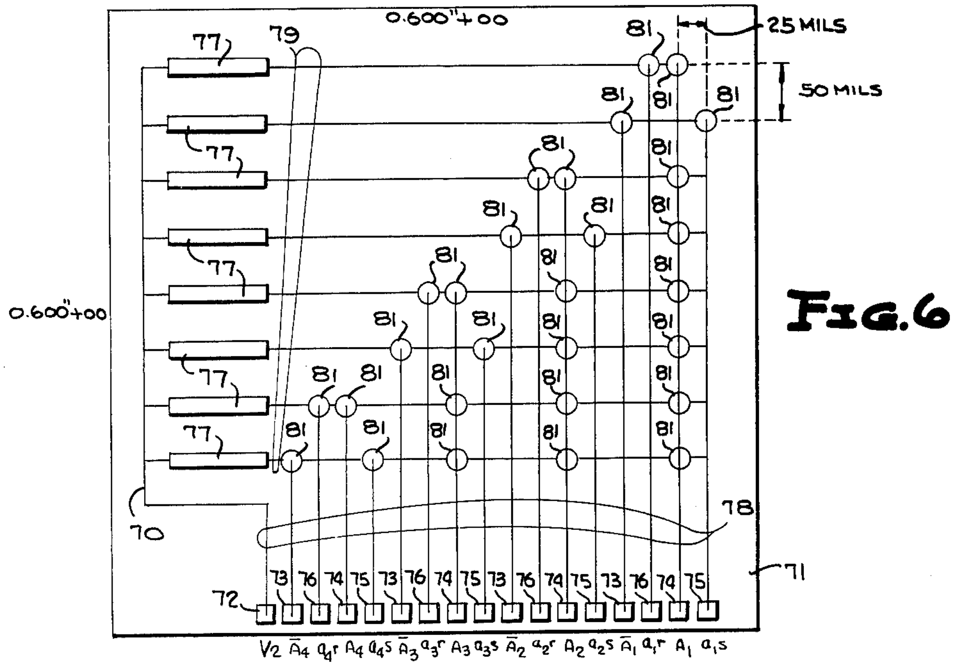
FIGURE 6 is an illustration of the diode matrix of FIGURE 2 as laid out on a thin film substrate.

Reference is now made to FIGURE 6 of the drawings which discloses the diode counting matrix of FIGURE 2 as it is fabricated on a micro-electronic member. The entire matrix arrangement consisting of matrices 21 and 22 of FIGURE 2 is located on square insulating board 71 which is approximately 0.600 inch on a side.

Along one edge of substrate board 71, a plurality of micro-electronic terminals 72–75 are provided. Terminal 72 is connected to an external bias source of constant positive voltage and via lead 70 to parallel resistors 74. Each of the leads 73 ad 74 is connected to the binary zero and one outputs, respectively, of flip flops 11–14. The set and reset inputs to flip flops 11–14 are derived via terminals 75 and 76, respectively.

Connected to each of the terminals 72–76 is a separate lead 78 which constitutes the columns of the matrices of FIGURE 2. Leads 78 are separated from each other by 25 mils in a preferred embodiment of the invention. Connected to resistors 77 are horizontal extending leads 79 which are separated from each other by 50 mils. At selected points of intersection of leads 78 and 79, determined by the logic for which the matrix is designed, diodes 81 are connected.

Figure 7:
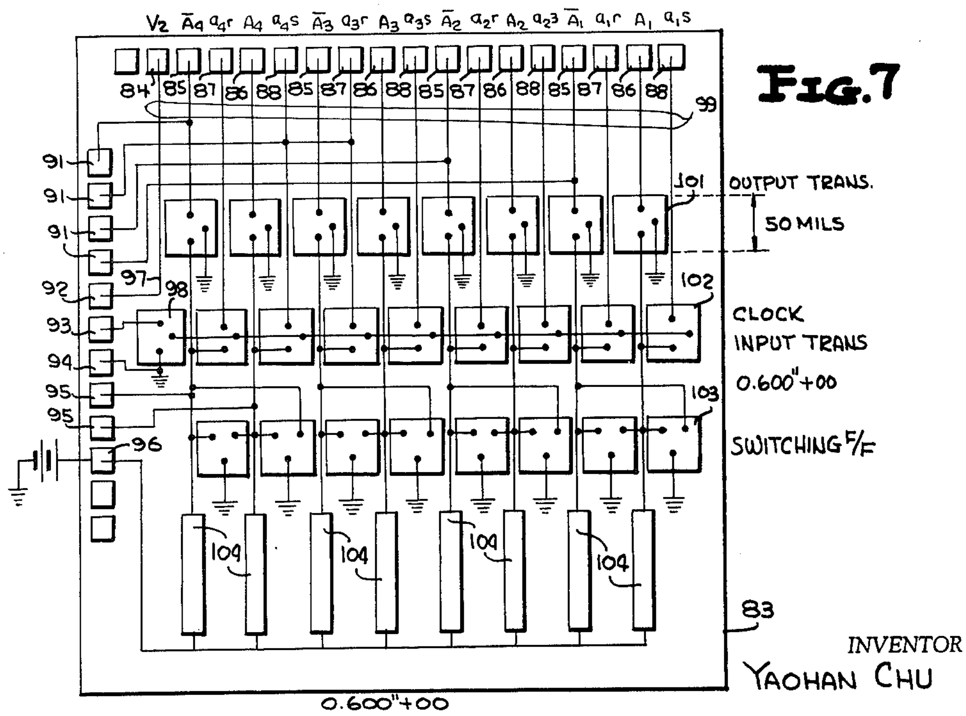
FIGURE 7 is an illustration of a substrate board containing the flip-flops of FIGURES 2–4.

Reference is now made to FIGURE 7 of the drawings which discloses the arrangement of a four flip-flop register mounted on insulating wafer 83. Wafer 83 is of exactly the same size as wafer 71 of FIGURE 6 to obtain uniformity of manufacturing. Board 83 includes two sets of orthogonally arranged terminals 84–88 and 91–95 which are interconnected to three rows 101–103 of transistors by vertically and horizontally extending leads and a plurality of resistors 104.

The transistors are laid out so that their electrodes are in the most convenient location for effecting the desired circuit interconnections. In consequence, the emitter of each transistor in row 103, which corresponds with the switching transistors 61 and 62, FIGURE 5, is located towards the bottom of the wafer while the collector and base are located towards the left and right edges of the circuit board. Each of the output transistors 69 and 71, FIGURE 5, in row 102 is positioned so that the collector and base electrodes are towards the bottom and top, respectively of the board while the emitter is located towards the right edge of the board. Transistor 98, the driver amplifier for transistors 69 and 71 is orientated with its emitter, base, and collector electrodes directed towards the bottom, top, and right side, respectively, of wafer 83. Input transistors 67 and 68 in row 101 are positioned with their bases, collectors, and emitters located towards the bottom, top, and right edges, respectively of the board. The transistors are topographically located with each of their 50 mil edges parallel to a corresponding side of wafer 83 in such a manner as to achieve ease of production.

Terminals 84–88, located along the upper edge of board 83 are adapted to be connected to associated conductors 72–76 of FIGURE 6 so that terminal 84 supplies a constant voltage to terminal 72, terminals 85 and 86 couple the binary zero and one outputs of flip flops 11–14, to terminals 73 and 74, and the reset and set inputs to the flip flops are coupled via terminals 87 and 88 to terminals 76 and 75. Along the left edge of wafer 83, the second set of terminals 91–96 are provided. Terminals 91 are connected to the outputs of the flip flops in row 103 to derive indications of the state of each flip flop. Terminal 92 is connected via lead 97 to terminal 84 and applies a positive D.C. voltage to the diodes 81 of FIGURE 6 via terminal 72 and lead 73. Lead 93 couples positive clock pulses to the base of transistor amplifier 98 which then supplies the negative clock pulses to the input transistors in row 102.

To preset the first order of the flip flops in row 103 to their correct state, depending upon the use desired for the circuit, input terminals 95 are provided. A positive D.C. voltage is connected to terminal 96 for powering the transistors in rows 102 and 103.

A plurality of vertically and horizontally extending leads are formed on the surface of wafer 83 to interconnect the various transistors together and to terminals 84–88 and 91–96. Vertical leads 99, connected between terminals 84–88 and the collector of each transistor in row 101 and the horizontal leads connected thereto, are preferably separated from each other by 25 mils, the same distance separating leads 78 of FIGURE 6 while the vertical leads between the various transistors are separated by 50 mils. The eight output transistors 69 ad 71 utilized in the circuit of FIGURE 5 are assembled together in horizontal row 101 while row 102 includes the eight input transistors 67 and 68. Driver amplifier 98 has its collector connected to the emitter of each of the input transistors in row 102 so that the application of a positive clock pulse to terminal 93 results in a negative input pulse being coupled to the emitter of each transistor in row 102. The collectors and bases of pairs of transistors in row 103 are interconnected with each other to form the flip flop switching circuits of FIGURE 5. The collector and base of each of the transistors in row 103, the collector of each of the transistors in row 102, and the base of each transistor in row 101 are connected via load resistors 104 to terminal 96 to establish the correct interconnections between the input, output and switching transistors.

The circuit boards of FIGURES 6 and 7 may take the form of either of the commonly used micro-electronic elements, i.e. of a solid state molecular electronics circuit or a thin film circuit. If the former type of circuit is utilized, wafers 71 and 83 are fabricated from silicon and the transistors, resistors and diodes are diffused on the wafer in a known manner. For a thin film circuit arrangement, the wafers are fabricated from a material such as a glass or ceramic substrate. The conductors, terminals, and resistors are deposited as thin films on the substrate surfaces and the transistors and diodes are appropriately mounted.

The geometrical configurations of FIGURES 6 and 7 have been found to be highly desirable because of their ease of manufacture and layout. Also this arrangement permits facile interconnections between adjacent wafers and ease of board replaceability.

Reference is now made to FIGURE 8 of the drawings, a block diagram of a simplified form of the present invention employing a memory having a capacity of two words, with four bits per word. The computer is of the parallel type having four bit number and instruction words, wherein the first three bits of each instruction word indicate the operation to be performed and the last bit indicates the address of the memory word controlled.

Instruction and number words are applied to memory 201 from eight separate switches 202, one switch being provided for each bit in both words. Read out control of the two words in memory 201 is provided by start-stop switch 203, which controls flip-flop 204. When start-stop flip-flop 204 is in a binary one state, indicative of switch 203 being in a start position, signals from address register 205 are coupled through address decoder 206 to memory 201. Address register 205 is selectively responsive to program register 207 which is capable of controlling the sequential operation of the computer to its various instructions. In the present simplified system, there is actually no need for a program register but it is included in the block diagram of FIGURE 8 and circuit diagram of FIGURES *9a* and *9b* for explaining the manner by which program control can be provided in a large system.

One word from memory 201 is selectively read out of it into buffer register 208. The signal read into buffer register 208 is coupled to sixteen state counter 209, the output of which is fed to an operation decoder matrix 211. Matrix controls the sequential operations performed by the computer in accordance with the instruction words fed to buffer register 208 and counter 209. The output of buffer register 208 is also selectively applied to accumulator 212 which includes arithmetic units to perform operations such as addition, subtraction, and shifting in either direction. Information flow between registers 208 and 212 is controlled by operation decoder or programmer 211 and the instruction word initially coupled thereto.

The entire system is under the control of clock source 213 which is selectively coupled to the various components under the control of operation decoder 211 and address register 205. To obtain an output indicative of the state of accumulator 212, each of its flip flops is connected to a pair of neon lights. Thereby, an indication of the binary status of each flip flop is derived and the resultant operation performed may be observed visually. Of course, read out may be performed in any number of other conventional, well-known manners.

Reference is now made to FIGURES 9*a*, 9*b* and 10 of the drawings to provide a complete operation description of the present computer. In the matrix system of FIGURES 9*a* and 9*b*, operation counter 209 includes flip flops 301–304, which when energized to their binary one states represent 8, 4, 2, 1, respectively. Counter 209 is arranged with its matrix 211 to be stepped through a selective sequence of 16 possible states. The states are denominated in accordance with the following table:

*Table I*

| | $F_1$ | $F_2$ | $F_3$ | $F_4$ |
|---|---|---|---|---|
| $f_0$ | 0 | 0 | 0 | 0 |
| $f_1$ | 0 | 0 | 0 | 1 |
| $f_2$ | 0 | 0 | 1 | 0 |
| $f_3$ | 0 | 0 | 1 | 1 |
| $f_4$ | 0 | 1 | 0 | 0 |
| $f_5$ | 0 | 1 | 0 | 1 |
| $f_6$ | 0 | 1 | 1 | 0 |
| $f_7$ | 0 | 1 | 1 | 1 |
| $f_8$ | 1 | 0 | 0 | 0 |
| $f_9$ | 1 | 0 | 0 | 1 |
| $f_{10}$ | 1 | 0 | 1 | 0 |
| $f_{11}$ | 1 | 0 | 1 | 1 |
| $f_{12}$ | 1 | 1 | 0 | 0 |
| $f_{13}$ | 1 | 1 | 0 | 1 |
| $f_{14}$ | 1 | 1 | 1 | 0 |
| $f_{15}$ | 1 | 1 | 1 | 1 |

As seen infra, the manner in which the counter 209 and operation decoder 211 are stepped through the states is not sequential according to the order $F_0, F_1, \ldots F_{15}$ but is dependent upon the instruction word in buffer register 208 and the matrix configuration of decoder 211, as depicted in the state diagram of FIGURE 10.

Memory unit 201 includes eight separate flip flops 331–338, of which flip flops 331–334 store the four bits of the zero order memory word and flip flops 335–338 store the four bits of the first memory word. Input to the memory flip flops is derived from the Q flip flops 341–348 which are connected selectively to flip flops 331–338 by energization of start-stop flip flop 204 to the stop position.

Flip flops 331–338 are interconnected by the diodes in matrix 201 to flip flops 351–354 in buffer register 208 so that the first bit in either of the memory words stored in flip flops 331 or 335 is selectively coupled to buffer register flip flop 351. Similarly the second, third, and fourth, bits of both words in memory flip flops 332–334 and 336–338, respectively, are selectively coupled to flip flops 352, 353, and 354 in buffer register 208.

The buffer register flip flops 351–354 are interconnected with the flip flops of operation counter 209 in such a manner that operation information is selectively transferred from flip flops 351–353 to flip flops 302–304, respectively. Address information is selectively coupled from the output of buffer register flip flop 354 to the input of address register 205 via the matrices interconnecting them.

The system of the present invention is capable of being instructed to perform the operations listed below in Table II.

*Table II.—Instruction code and micro-operations*

| Instruction | Instruction code | Micro-operations |
|---|---|---|
| Addition | 000x | (M<C>)=> (R).<br>(A)+(R)=>(A). |
| Subtraction | 001x | (M<C>=>(R).<br>(A)−(R)=>(A). |
| Jump if negative # in acc. (conditional transfer). | 010x | If $A_1$=1, instruction at address x.<br>If $A_1$=0, instruction at next address. |
| Store | 011x | (A)=>(M<C>). |
| Jump (unconditional transfer). | 100x | next instruction at address x. |
| Clear accumulator | 101x | (O)=>(A). |
| Shiftright | 1100<br>F6=>F14 | $A_1$=>$A_1$.<br>$A_{i-1}$=>$A_i$ for i=2 to 4. |
| Shiftleft | 1101<br>F6=>F13 | $A_4$=>$A_4$.<br>$A_{i+1}$=>$A_i$ for i=1 to 3. |
| Stop | 111x | (0)=>(G), (0)=>(C), (0)=> (P). |

In each case, except the shift right and the shift left conditions, the instruction word includes the first three bits in the column designated "instruction code" and the instructed address is indicated by the fourth bit in the column. The operations associated with each core are designated in the last column, "micro-operations."

To interpret the column designated "micro-operations" parentheses around a particular letter indicates that each flip flop associated with that letter is acted upon while lack of parentheses around a letter indicates that only a particular flip flop in the array of flip flops for the register of interest is acted upon. Thus, the "micro-operation" for the clear accumulator instruction is read as "0 goes to each of the accumulator register flips flops 311–314," i.e. each of the accumulator flip flops is reset to a binary zero state. To provide another example, consider the first operation of the instruction addition; this is interpreted as signifying that the contents of one word of the memory register, the word being designated by the status of address register or flip flop 205, are shifted to buffer register flip flops 351–354. The second operation under addition indicates that the binary status of the 8, 4, 2, 1 flip flops 311–314 in accumulator 212 is added to that stored in buffer register 351–354 and the resultant is coupled back to the accumulator flip flops.

To provide a better understanding of the manner in which the system of the present invention functions, it is initially assumed that addition of the binary numbers 0011 and 001 is to be accomplished, i.e.

$$\begin{array}{r} 0\ 0\ 1\ 1 \\ +0\ 0\ 0\ 1 \\ \hline 0\ 1\ 0\ 0 \end{array}$$

The first operation is to manually set start-stop switch 203 on the $\overline{S}$ terminal so that flip flop 204 is set in a $\overline{G}$ state. In consequence, the $\overline{G}$ output of flip flop 204 is activated and the signals stored in flip flops 341–348 are transferred to flip flops 331–338, respectively. Since an addition operation is being performed, flip flops 341–343 are energized to 0, 0, 0 (see Table II), as are flip flops 331–333, in response to activation of switch 203 to the stop position. Input flip flop 344 and storage flip flop 334 are set to binary one states in response to this operation, thereby store a signal to indicate that the addition operation is being performed with the first, rather than the zero word in the memory. To preset the number 0011 into the first word of the memory register, input flip flops 345–348 are initially set to 0011 and their outputs are transferred to flip flops 335–338, respectively, upon activation of switch 203 to the stop position.

As is seen infra, operation counter flip flops 301–304 are set to $F_{15}$ whenever a stop operation is programmed. With switch 203 on the stop position, $\overline{S}$, flip flops 301–304 of operation counter 209 remain in the $F_{15}$ state for each clock pulse, as indicated by line 361, FIGURE 10. This is readily seen by inspection of counting circuit 209 and its matrix 211 since the $\overline{G}$ output of flip flop 204 is not connected with any of the $F_{15}$ horizontal outputs in matrix 211.

It is to be noted that each of the horizontal lines in matrix 211 includes an indication of a particular F state either singly or in combination as an AND function with a particular flip flop status in some other segment of the computer. Whenever the condition or conditions defined by the particular horizontal line are achieved by the computer, the following clock pulse coupled to the network is supplied to that line and all of the resulting outputs connected thereto. Outputs from matrix 211 are selectively coupled to other matrices in the computer either directly or through one of the amplifiers in bank 350.

Returning now to the addition operation, with counter 209 set to $F_{15}$, it is assumed that switch 203 is now activated to engage its S terminal and applies a voltage to set flip flop 204 to its G state, binary one. This enables the next clock pulse to pass to the $F_{12}G$ line, setting flip flops 301–304 to the $F_{12}$ state, as designated by line 362, FIGURE 10, and causes loading of flip-flops 205 and 207 with zeros.

With the flip flops of register 209 maintained in the $F_{12}$ state the following clock pulse causes flip flops 301–304 to be activated into the $F_{10}$ state, as designated by line 363, FIGURE 10. Transferring operation counter 209 from an $F_{12}$ to an $F_{10}$ status results in transferring the zero word in memory flip flops 331–334 to buffer register flip flops 351–354, respectively, because address register 205 has been previously activated into its $\overline{C}$ state, binary zero. Information is passed in this manner because an output signal is derived from matrix 211 on lead 364 when flip flops 301–304 are leaving the $F_{12}$ state. The signals on lead 364 and the $\overline{C}$ output of address register 205 are combined in matrix 365 to enable the outputs of flip flops 331–334 to be transferred to the inputs of flip flops 351–354, respectively. Thereby, flip flops 351, 352, 353, and 354 are loaded with 0001.

In response to the succeeding clock pulse, the operation bits stored in flip flops 351–353 are transferred to flip flops 302–304, the address bit stored in flip flop 354 is transferred to address flip flop 205, and flip flop 301 is set to $\overline{F}_1$. Hence, operation counter flip flops 301–304 are now shifted to 0000, the $F_0$ state, as indicated by line 371 on the state diagram, and address register 205 activated to the $C_1$ state. At the same time, a binary half adder operation is performed in program flip flop 207 to advance it to the P status, assuming it formally was reset to $\overline{P}$. If flip flop 207 was previously set to $\overline{P}$, it would have been advanced to the set state P, due to the connections of its set and reset inputs with the $F_{10}P$ and $F_{10}\overline{P}$ output leads.

In response to the next clock pulse, the first memory word stored in flip flops 335–338 is coupled to and stored in flip flops 351–354 of the buffer register. Simultaneously, operation counter 209 is transferred from the $F_0$ state to the $F_8$ state, as indicated by line 372, since lead 364 provides a signal to energize matrix 365. Hence transfer of information from flip flops 335–338 to flip flops 351–354 is effected under control of the C output of address register 205.

As operation counter goes from $F_8$ to $F_{11}$ in response to the next clock pulse (see line 376, FIGURE 10), an activating pulse is produced on lead 372 to couple signals stored in buffer register flip flops 351–354 to accumulator register flip flops 311–314. This is accomplished by coupling the potential from battery 373 to the selected inputs of flip flops 311–314, as determined by the status of flip flops 351–354.

Since flip flops 314 and 354 are now set to $\overline{A}_4$ and $R_4$, hence have large positive voltages on their $\overline{A}_4$ and $R_4$ outputs positive voltage is coupled from battery 373 to the set terminal of flip flop 314 via the appropriate diode in matrix 374 and one of the amplifiers in amplifier group 375. In consequence, flip flop 314 is set to the binary one state. Similarly, flip flop 313 is now set to a binary one in response to the positive voltage coupled to its set terminal from battery 373 under the influence of the $F_8$ signal on lead 372 and the $R_3$ output of flip flop 353. Since flip flops 351 and 352 of the buffer register are maintained in their zero states in response to the specified input quantity, flip flops 311 and 312 are also maintained at the zero binary states.

The next clock pulse shifts counter 209 from $F_{11}$ to $F_{12}$ and translates the binary zero stored in program flip flop 207 to address register 205. By this time the memory flip flops have been set to store a further addition instruction (0000) in the zero memory word and the data word, the numeral one (0001), in the first word by an external programming source, not shown or through the intermediary of flip flops 341–348. In the very simplified system shown herein the system is actually stopped by activation of switch 203 to the $\overline{S}$ position and data is reloaded into the memory flip flops 331–338 from the Q flip flops 341–348.

The next three clock pulses cause the operation counter 209 to be stepped from $F_{12}$ to $F_8$ through $F_{10}$ and $F_0$. This causes the contents of the zero word in the memory flip flops 331–334 to be transferred to the buffer register flip flops 351–354. Subsequently, the contents of buffer register flip flops 351–353 are transferred to operation counter flip flops 302–304, respectively, and the address bit for the first memory word stored in flip flop 354 is translated to address register flip flop 205. The contents of the first memory word stored in flip flops 335–338 are then transferred to buffer register 208 so that flip flops 351, 352, 353, and 354 store 0001.

The next clock pulse activates operation counter 209 from the $F_8$ to the $F_{11}$ state and causes the contents of buffer register 208 to be added to the stored value in accumulator register 212, i.e. the operation $$\begin{array}{r} A=0011 \\ +R=0001 \\ \hline A=0100 \end{array}$$

This is accomplished by supplying the positive voltage from battery 373 to the reset input of flip flop 314 through a path established by energization of lead 372 in response to the $F_8$ output of operation counter 209. This path is established because the $R_4$ and $A_4$ outputs of flip flops 314 and 354 are energized at the same time that a pulse is coupled to lead 372.

At this time, a load input voltage is supplied to carry flip flop 323 from battery 373 due to the $A_4$ and $R_4$ outputs and the flip flop is maintained at a $K_3$ output. The $K_3$ and $A_3$ outputs are combined to permit gating of the voltage of battery 373 to the reset input of flip flop 313 so that it is returned to zero. Because flip flop 313 is now restored to $\overline{A}_3$, the input voltage coupled from battery 373 to the input of flip flop 322 is changed from a large to a small value and carry flip flop 322 is now switched from its zero to one state. In consequence, a $K_2$ output is derived from flip flop 322 and is combined with the $\overline{A}_3$ output of flip flop 313 to permit coupling of the voltage from battery 373 to the set input of flip flop 312. Activation of flip flop 312 into the binary one or set state fails to effect any of the remaining elements in the accumulator proper or in its carry segment and the accumulator is set to a value 0100.

Flip flops 321–323 in the carry segment of the accumulator are of the mono-stable type having but a single input. Flip flops 321–323 are arranged to normally provide $\overline{K}_3$ outputs and to momentarily provide $K_3$ outputs in response to small voltages at their inputs. When the full voltage of battery 373 is applied to the input of one of the flip flops 321–323, the flip flop is quickly, but not instantaneously returned to its zero state. This enables the flip flops to have a short duration memory for addition purposes when counter 209 goes from $F_8$ to $F_{11}$ and obviates the need for external reset.

In response to the next clock pulse, operation counter 209 is switched to the $F_{12}$ state and the operation indicated supra in connection with the first addition operation is performed.

It is assumed that by the time operation counter 209 is activated back to $F_{12}$, memory flip flops 331–334 have the subtraction word 0011 stored therein, and that flip flops 335–338 have the data bits 0010 stored therein. Hence, activation of operation counter 209 to the $F_{12}$ state causes flip flops 351–354 of the buffer register to be loaded with 0011 which is subsequently transferred to flip flops 302–304 and 205 in response to the clock pulse which transfers operation counter 209 from $F_{10}$ to $F_1$.

With the operation counter at $F_1$, the contents of the first word in the memory 201, as determined by the status of flip flop 205, are transferred to buffer register 208, in the same manner as $F_0$. In response to the next clock pulse, operation counter 209 is activated from $F_9$ to $F_8$ which causes the contents of buffer register 208 to be complemented via matrix 380 and places a binary one in Y flip flop 377.

Since the instruction word 001 is indicative of subtraction and the present computer forms the subtraction operation in the well-known complementing and end-around carry process, loading of flip flop 377 to its set or binary one state is necessary to introduce the end-around carry into the lowest order of the addition operation which is to be performed for accomplishing subtraction. Hence, the operation $$\begin{array}{r} 0100 \\ -0010 \\ \hline 0010 \end{array}$$

is performed by complementing 0010 to 1101 and adding an end-around carry so that the operation is $$\begin{array}{r} 0100 \\ 1101 \\ 0001 \\ \hline 0010 \end{array}$$

Since the manner in which the complementing network functions has been described supra in connection with FIGURE 4, there is no need seen for describing the manner in which 0010 is transferred to 1101. End-around carry flip flop 377 is activated to its binary one state by its direct connection with the $F_9$ output of matrix 211 and its set input.

In response to the next clock pulse, operation counter 209 is stepped from $F_8$ to $F_{11}$, and the addition operation is performed substantially as indicated above. There is a slight modification in the addition operation, however, due to the binary one now in flip flop 377. Since flip flops 377 and 354 are in the Y and $R_4$ states, a binary one is loaded into carry flip flop 323. The $K_3$ output of flip flop 323 is now combined with the $\overline{A}_3$ output of flip flop 313 to drive the latter flip flop to its binary one state by the pulse coupled thereto from lead 372 when operation counter 209 is leaving the $F_8$ state. The $R_2$ and $A_2$ outputs of flip flops 352 and 312 are combined with the $F_8$ output of operation counter 209 on lead 372 to drive accumulator flip flop 312 to tthe binary zero state. The lowered input to flip flop 321 causes it to be driven to a binary one. The $K_1$ output of flip flop 321 is combined with the $R_1$ output of flip flop 351 and the $F_8$ output of operation counter 209 on lead 372 to drive flip flop 311 to its binary zero state so that the accumulator flip flops are activated to 0010, the resultant of the subtraction operation. Operation counter 209 is now stepped to $F_{12}$ and the previously recited operations are performed.

It is assumed that when operation counter 209 again reaches its $F_{12}$ state the first three bits of the zero word in memory are loaded with 010. As indicated by Table II, this instruction code is a conditional transfer instructing the computer to proceed to the first instruction address if the bit stored in flip flop 334 is one, or in the alternative instructing the computer to carry out the instruction at the zero address if flop flop 334 is in the zero state. In the very simplified version of the invention disclosed in FIGURE 9 such instructions have virtually no purpose. However, to provide an understanding of the manner in which a large scale computer functions to conditionally transfer instruction words the computer operations will be described.

In response to counter 209 reaching $F_{12}$, the contents of flop flops 331–334 are retransferred to buffer register flip flops 351–354. The next clock pulse causes the contents of flip flops 351–353 to be transferred to flip flops 302–304 and the contents of flip flop 354 to be transferred to address register 205, whereby operation counter 209 is rendered into its $F_2$ state. If it is assumed that flip flop 311 is in the $A_1$ state, the $F_2$ output is combined with $A_1$ to drive operation counter 209 to the $F_4$ state in response to the next clock pulse. To the contrary, if flip flop 311 is in the $\overline{A}_1$ state, the $F_2$ output of operation counter 209 is combined with the next clock pulse to drive the operation counter to the $F_{11}$ state.

With the operation counter in the $F_4$ state, the contents of address register C are transferred to program register P so that the address originally inserted into the memory at the beginning of this program sequence is coupled to program flip flop 207 to effect subsequent control over the operation counter. If, however, flip flop 311 is in a zero state the reverse operation occurs, i.e., the contents of program register 207 are shifted to address register 205 and the programming sequence occurs in its normal predetermined fashion. After the operation counter has been stepped to either its $F_{11}$ or $F_4$ state, the next pulse returns it to the $F_{12}$ state.

It is now assumed that address register 205 is at the binary zero state and that the operation code of the zero memory word stores the bits 011 and the address bit is 1. This causes flip flops 351–354 to be loaded with 011 in response to transfer from $F_{12}$ to $F_{10}$ by the next clock pulse. The following clock pulse causes operation counter 209 to be changed from $F_{10}$ to $F_3$ with the usual information transfer when leaving $F_{10}$.

The next pulse, which causes counter 209 to leave $F_3$, results in transfer of the accumulator word to the first memory word, i.e. transfer of the bits stored in flip flops 311–314 to flip flops 335–338. This is accomplished because lead $F_3$ energizes matrix 382. Since address flip flop 205 has been activated to its one state, transfer of the accumulator contents to memory flip flops 335–338 occurs through the diode paths established between the various flip flop inputs and outputs.

The next clock pulse causes operation counter 209 to be stepped from $F_{11}$ to $F_{12}$. It is assumed that by the time the computer returns to $F_{12}$, the operation segment of the zero memory word has been activated to the 100 state. The address segment of the zero memory word, flip flop 334, is activated to either the zero or one state depending upon the desired ultimate location of information controlled by the unconditional transfer instruction word, designated 100. In going from $F_{12}$ to $F_{10}$, the contents of flip flops 331–334 are coupled to buffer register 208.

The next pulse causes operation counter 209 to be activated to $F_4$, as indicated by line 383, FIGURE 10, and the immediately thereafter occurring clock pulse causes transfer of the bits stored in address register 205 to program register 207. Since address register 205 has been previously coded by the contents of memory register 334 through the intermediary of flip flop 354, the computer is programmed with the instruction word designated on the next cycle of operation.

By the time operation counter 209 is again activated to its $F_{12}$ state, it is assumed that the operation segment of the zero memory word is 101. This subsequently causes the flip flops of operation counter 209 to be rendered into its $F_5$ state.

As operation counter 209 goes from $F_5$ to $F_{11}$, an output pulse is derived on lead 385 to permit activation of matrix 386. Activation of matrix 386 is by this pulse results in each of the flip flops 311–314 in the accumulator register being set to the zero state. Hence, the accumulator clear operation is performed in response to the instruction 101. Repetition of the usual counter sequence from that point now occurs.

It is now assumed that accumulator 212 has been reactivated so that its flip flops store binary signals indicative of a predetermined number, e.g. 1101. It is further assumed when counter 209 is now leaving $F_{12}$ that the zero memory word is 1100 and that the address register is set to read out the zero memory word. In consequence, when counter 209 is shifted to $F_{10}$, flip flops 351–354 of buffer register 208 are loaded with 1101, respectively.

In response to the following clock pulse signal, flip flops 301–304 of operation counter 209 are loaded with the binary bits 110 and a binary one is loaded into address flip flop 205. The operation counter 209 is now at the $F_6$ state, as indicated by the line 391, FIGURE 10.

In response to the next clock pulse, operation counter 209 is switched to $F_{13}$ since the $R_4$ output of flip flop 354 is combined with the $F_6$ status of operation counter 209, as indicated by line 392, FIGURE 10.

Activation of operation counter 209 from $F_{13}$ to $F_{11}$ by the next clock pulse results in an output signal being derived on lead 394 and activation of matrix 395. Matrix 935 is constructed to shift the contents of accumulator flip flops 311–313 to the left and to maintain the lowest order flip flop 314 in its previous state. This may be seen by noting that the one outputs of flip flops 313–314 are gated to the set inputs of the adjacent flip flops to the left. Similarly the binary zero outputs of flip flops 313–214 are gated to the reset inputs of the adjacent flip flop to the left when a signal is received on input 394 of matrix 395.

To effect shifting of information in accumulator 212 towards the right, rather than the left, the buffer register is responsive to the memory contents so that it stores the instruction word 1100. Since the status of flip flops 351–353 is the same for the shift right condition as the previously described shift left condition. operation counter 209 is again switched to the $F_6$ state. In response to the following clock pulse, however, operation counter 209 is driven to $F_{14}$ because no input is applied thereto on the $F_6R_4$ lead, input being supplied to its stages from the $F_6$ lead only, as indicated by line 396, FIGURE 10.

As operation counter 209 leaves the $F_{14}$ state, a positive voltage is developed on lead 397 in response to the next clock pulse and energization is provided to matrix 398. The diodes in this matrix are arranged so that the binary one states of flip flops 311–313 are switched to the set inputs of flip flops 312–314, respectively. The binary zero states of flip flops 311–313 are switched to the reset inputs of flip flops 312–314. The set and reset inputs of flip flop 311 are not responsive to the output of matrix 398 and flip flop 311 remains in the same status which it previously occupied. It is thus seen that the accumulator contents are shifted to the right, the result desired.

As operation counter 309 leaves either $F_{13}$ or $F_{14}$, it is transferred to $F_{11}$ in response to a clock pulse, since the inputs to flip flops 301–304 from the $F_{13}$ and $F_{14}$ leads in matrix 211 are identical.

To program the present computer to stop, flip flops 351–354 of buffer register 208 are loaded with ones from the memory flip flops under the control of address flip flop 205. When operation counter 209 is switched to $F_{10}$, this causes flip flops 302–304 to be loaded with binary ones and activates the operation counter to $F_7$, as designated by leads 399, FIGURE 10. The following clock pulse combines with the $F_7$ status of operation counter 209 to supply a reset input to start-stop flip flop 204 so that the positive voltage is derived on its $\overline{G}$ output. This terminates the operation of the computer cycle as effectively as connecting switch 203 to its $\overline{S}$ output. Thus, the computer may be stopped either manually by activating switch 203 or with a precoded or preprogrammed code.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a computer subsystem for performing a predetermined computer function N flip flops, each of said flip flops having a pair of complementary outputs and a pair of complementary inputs, a switch matrix having 4N columns of leads and 2N rows of leads, the first 2N of said columns being connected to said outputs, the other 2N of said columns being connected to said inputs, each of said columns being connected to a different one of said inputs and outputs, said switch matrix including: first gate means for selectively coupling the first 2N of said columns to said rows, and second gate means for selectively coupling the second 2N of said columns to said rows, said first and second gate means being connected to said rows and columns in a predetermined manner to effect said function.

2. In a computer subsystem for performing a predetermined computer function, N flip flops, each of said flip flops having a pair of complementary outputs and a pair of complementary inputs, a switch matrix having 4N columns of leads and 2N rows of leads, the first 2N of said columns being connected to said outputs, the other 2N of said columns being connected to said inputs, each of said columns being connected to a different one of said inputs and outputs, said switch matrix including: first gate means for selectively coupling and decoupling the first 2N of said columns to said rows, and second gate means for selectively coupling the decoupled ones of said rows to the second 2N of said columns, said first and second gate means being connected to said rows and columns in a predetermined manner to effect said function.

3. The computer of claim 2 wherein both of said switch means is located on a microelectronic insulating circuit board, and each of said switch means includes a diode having one electrode connected to one of said columns and another electrode connected to one of said rows.

4. The computer of claim 2 wherein said flip flops are located on a microelectronic insulating board, each of said flip flops includes a pair of input transistors, a pair of output transistors, and a pair of switching transistors, said input, output, and switching transistors being arranged in first, second, and third rows, respectively, on said board.

5. In a computer subsystem for performing a predetermined computer function, N flip flops, each of said flip flops having a pair of complementary outputs and a pair of complementary inputs, a switch matrix having 4N columns of leads and 2N rows of leads, the first 2N of said columns being connected to said outputs, the other 2N of said columns being connected to said inputs, each of said columns being connected to a different one of said inputs and outputs, a source of current coupled to each of said rows, said matrix including: first gate means selectively coupled to said rows and to the first 2N of said columns, second gate means selectively coupled to said rows and to the second 2N of said columns, said first gate means comprising means for selectively controlling the flow of said current in said rows to said second 2N of said columns in accordance with the states of said flip flops, said second gate means including means for selectively controlling the flow of said current to said inputs, said first and second gate means being connected to said rows and columns in a predetermined manner to effect said function.

6. In a computer subsystem for performing a predetermined function, N flip flops, each of said flip flops having a pair of complementary outputs and a pair of complementary inputs, a switch matrix having 4N columns of leads and 2N rows of leads, the first 2N of said columns being connected to said outputs, the other 2N of said columns being connected to said inputs, each of said columns being connected to a different one of said inputs and outputs, a source of current coupled to each of said rows, said matrix including: first gate means selectively coupled to said rows and to the first 2N of said columns, second gate means selectively coupled to said rows and to the second 2N of said columns, said first gate means comprising means for diverting the flow of said current from selected ones of said second 2N columns in accordance with the status of said flip-flops, said second gate means including means for selectively controlling the flow of the undiverted current to said inputs, said first and second gate means being connected to said rows and columns in a predetermined manner to effect said function.

7. The computer of claim 6 wherein each of said switch means includes a diode having one electrode connected to one of said columns and another electrode connected to one of said rows.

8. A counter comprising N flip-flops, each of said flip flops having a pair of complementary outputs and a pair of complementary inputs, said flip-flops being ordered to represent $2^0, 2^1, 2^2 \ldots 2^{N-1}$, one of said outputs and one of said inputs of each flip flop being designated as a binary zero, the other of said outputs and the other of said inputs of each flip flop being designated as a binary one, a switch matrix having 4N columns and 2N rows, the first 2N of said columns being connected to said outputs and the other 2N of said columns being connected to said inputs, said rows being designated as binary zeros and ones of the respective flip-flop orders, said switch matrix including: first separate gate means connected only between the column connected to the binary zero output of the Kth order flip flop and the row designated as the binary zero of the Kth order flip-flop, where K is any integer less than N, second separate gate means connected only between the column connected to the binary one output of the Ith order flip flop and each of the rows designated as the binary one of the Ith through (N−1)th order flip flops and each of the rows designated as the binary zero of the (I−1)th through (N−1)th order flip-flops, where I is any integer less than N, third separate gate means connected only between the column connected to the binary zero input of the Lth order flip flop and the row designated as the binary one of the Lth order flip flop, where L is any integer less than N, and fourth separate gate means connected only between the column connected to the binary zero input of the Gth order flip flop and the row designated as the binary one of the Gth order flip flop, where G is any integer less than N.

9. A complementing network comprising N flip-flops, each of said flip flops having a pair of complementary outputs and a pair of complementary inputs, said flip-flops being ordered to represent $2^0, 2^1, 2^2 \ldots 2^{N-1}$, one of said outputs and one of said inputs of each flip flop being designated as a binary zero, the other of said outputs and the other of said inputs of each flip flop being designated as a binary one, a switch matrix having 4N columns and 2N rows, the first 2N of said columns being connected to said outputs and the other 2N of said columns being connected to said inputs, said rows being designated as binary zeros and ones of the respective flip-flop orders, said switch matrix including: first separate gate means connected only between the column connected to the binary zero output of the Kth order flip flop and the row designated as the binary zero of the Kth order flip-flop where K is any integer less than N, second separate gate means connected, only between the column connected to the binary one output of the Ith order flip flop and the row designated as the binary one of the Ith order flip flop, where I is any integer less than N, third separate gate means connected only between the column connected to the binary zero input of the Lth order flip flop and the row designated as the binary one of the Lth order flip flop, where L is any integer less than N, and fourth separate gate means connected only between the column connected to the binary zero input of the Gth order flip flop and the row designated as the binary one of the Gth order flip flop, where G is any integer less than N.

10. A shift register network comprising N flip flops, each of said flip flops having a pair of complementary outputs and a pair of complementary inputs, said flip flops being ordered to represent $2, 2^1, 2^2 \ldots 2^{N-1}$, one of said outputs and one of said inputs of each flip flop being designated as a binary zero, the other of said outputs and the other of said inputs of each flip flop being designated as a binary one, a switch matrix having 4N columns and 2N rows, the first 2N of said columns being connected to said outputs and the other 2N of said columns being connected to said inputs, said rows being designated as binary zeros and ones of the respective flip-flop orders, said switch matrix including: first separate gate means connected only between the column connected to the binary zero output of the Kth order flip flop and the row designated as the binary zero of the Kth order flip-flop, where K is any integer less than N, second separate gate means connected only between the column connected to the binary one input of the $(L+1)$th order flip flop and the row designated as the binary one of the Ith order flip flop, where I is any integer less than N, third separate gate means connected only between the column connected to the binary one input of the $(L+1)$th order flip flop and the row designated as the binary one of the Lth flip flop, where L is any integer less than N, and fourth separate gate means connected only between the column connected to the binary one input of the $(G+1)$th order flip flop and the row designated as the binary one of the Gth flip flop, where G is any integer less than N and the Nth order flip flop is the zero order flip flop.

11. A computer comprising a multi-word memory, a buffer register, an accumulator register, a programmer having a plurality of different states which are reached by predetermined selective operations, said programmer including; a plurality of bistable devices, each of said devices having inputs and outputs, and a switching matrix having inputs responsive to the outputs of said devices and outputs coupled to the inputs of said devices; switch matrix means for selectively coupling a word in said memory to said buffer register in response to a first state of said programmer, matrix switching means for coupling instruction and data words from said buffer register to said programmer in response to a second state of said programmer, said instruction words controlling the programmer operation selected, and matrix switch means for selectively coupling words between said buffer register and said accumulator in response to at least one other programmer state.

12. The computer of claim 11 wherein said matrix switch means includes means for adding the buffer register word to the accumulator register word.

13. The computer of claim 12 wherein said means for adding includes; a plurality of bistable carry devices, and means for combining the outputs of the buffer register, the accumulator register, and the carry devices and coupling the resultant to the acumulator register in response to one of said other programmer states.

14. The computer of claim 11 wherein said matrix switch means includes means for subtracting the buffer register word from the acumulator word.

15. The computer of claim 14 wherein said means for subtracting includes means for complementing the buffer register word in response to one of said programmer states.

16. The computer of claim 15 wherein said means for subtracting includes an end around carry bistable device set to one state by said one programmer state, a plurality of bistable carry devices, and means for combining the outputs of the buffer register, the accumulator register, and the bistable devices and coupling the resultant to the accumulator in response to one of said other programmer states.

17. The computer of claim 11 wherein said matrix switch means includes means for shifting the accumulator register contents.

18. The computer of claim 11 wherein said matrix switch means includes means to set the accumulator to a predetermined state.

19. In a computer subsystem for performing a predetermined computer function comprising N flip-flops, each of said flip-flops having a pair of complementary outputs and a pair of complementary inputs, a switch matrix having 4N columns of leads and 2N rows of leads, the first 2N of said columns being connected to said outputs, the other 2N of said columns being connected to said inputs, each of said columns being connected to a different one of said inputs and outputs, said switch matrix including: shunt AND gate means for selectively coupling and decoupling the first 2N of said columns to said rows and series OR gate means for selectively coupling the second two N of said columns to said rows, said AND and OR gate means being connected to said rows and columns in a predetermined manner to effect said function.

20. In a computer subsystem for performing a predetermined computer function comprising N flip-flops, each of said flip-flops having a pair of complementary outputs and a pair of complementary inputs, a switch matrix having 4N columns of leads and 2N rows of leads, the first 2N of said columns being responsive to the 2N outputs of said N flip-flops, the 2N inputs of said N flip-flops being connected to be responsive to the other 2N of said columns, each of said columns being connected to a different one of said inputs and outputs, said switch matrix including: first diode shunt AND gate means for selectively coupling and decoupling the first 2N of said columns to said rows, and series diode OR gate means for selectively coupling the decoupled ones of said rows to the second 2N of said columns, said AND and OR gate means being connected to said rows and columns in a predetermined manner to effect said function.

21. In a computer subsystem for performing a predetermined computer function, N flip-flops, each of said flip-flops having a pair of complementary outputs and a pair of complementary inputs, a switch matrix having 4N columns of leads and 2N rows of leads, the first 2N of said columns being connected to be responsive to said outputs, the other 2N of said columns being connected to said inputs for coupling signals thereto, each of said columns being connected to a different one of said inputs and outputs, said switch matrix including: AND gate means for selectively coupling and decoupling said first 2N of said columns to said rows, and OR gate means for selectively coupling the other 2N of said columns to said rows, both of said gate means being connected to said rows and columns in a predetermined manner to effect said function; and a clock pulse source connected in parallel to each of said rows.

22. A counter comprising N flip-flops, each of said flip-flops having a pair of complementary outputs and a pair of complementary inputs, said flip-flops being ordered to represent $2^0, 2^1, 2^2, \ldots 2^{N-1}$, one of said outputs and one of said inputs of each flip-flop being designated as a binary zero, the other of said outputs and the other of said inputs of each flip-flop being designated as a binary one, a switch matrix having 4N columns and 2N rows, the first 2N of said columns being connected to be responsive to said 2N outputs and the other 2N of said columns being connected to couple signal to said inputs, said rows being designated as binary zeros and ones of the respective flip-flop orders, said switch matrix including: first AND gate means connected only between the column connected to the binary zero output of the Kth order of flip-flop and the row designated as the binary zero of the Kth order flip-flop, where K is every integer less than N, second AND gate means connected only between the column connected to the binary one output of the Ith order flip-flop and each of the rows designated as the binary one of the Ith through $(N-1)$th order flip-flops and each of the rows designated as the binary zero of the $(I+1)$th through $(N-1)$th order flip-flops, where I is every integer less than N, first OR gate means connected only between the column connected to the binary zero input of the Lth order flip-flop and the row designated as the binary one of the Lth order flip-flop, where L is every integer less than N, and second OR gate means connected only between the column connected to the binary zero input of the Gth order flip-flop and the row designated as the binary one of the Gth order flip-flop, where G is every integer less than N.

23. The counter of claim 22 further including a clock pulse source, and means connecting said clock pulse source in parallel with each of said rows.

24. The counter of claim 22 wherein said AND and OR gate means all include only diode switching means, said AND gate means being shunt gates, said OR gate means being series gates.

25. A complementing network comprising N flip-flops, each of said flip-flops having a pair of complementary outputs and a pair of complementary inputs, said flip-flops being ordered to represent $2^0, 2^1, 2^2 \ldots 2^{N-1}$, one of said outputs and one of said inputs of each flip-flop being designated as a binary zero, the other of said outputs and the other of said inputs of each flip-flop being designated as a binary one, a switch matrix having 4N columns and 2N rows, the first 2N of said columns being connected to be responsive to said outputs and the other 2N of said columns being connected to couple signals to said inputs, said rows being designated as binary zeros and ones of the respective flip-flop orders, said switch matrix including: first AND gate means connected only between the column connected to the binary zero output of the Kth order flip-flop and the row designated as the binary zero of the Kth order flip-flop, where K is every integer less than N, second AND gate means connected only between the column connected to the binary one output of the Ith order flip-flop and the row designated as binary one of the Ith order flip-flop, where I is every integer less than N, first OR gate means connected only between the column connected to the binary zero input of the Lth order flip-flop and the row designated as the binary one of the Lth order flip-flop, where L is every integer less than one, and second OR gate means connected only between the column connected to the binary zero input of the Gth order flip-flop and the row designated as the binary one of the Gth order flip-flop, where G is every integer less than N.

26. The counter of claim 25 further including a clock pulse source, and means connecting said clock pulse source in parallel with each of said rows.

27. The counter of claim 25 wherein said AND and OR gate means all include only diode switching means, said AND gate means being shunt gates, said OR gate means being series gates.

28. A shift register network comprising N flip-flops, each of said flip-flops having a pair of complementary outputs and a pair of complementary inputs, said flip-flops being ordered to represent $2^0, 2^1, 2^2, \ldots 2^{N-1}$, one of said outputs and one of said inputs of each flip-flop being designated as binary zero, the other of said outputs and the other of said inputs of each flip-flop being designated as a binary one, a switch matrix having 4N columns and 2N rows, the first 2N of said columns being connected to be responsive to signals deriving from said outputs and the other 2N of said columns being connected to couple signals to said inputs, said rows being designated as binary zeros and ones of the respective flip-flop orders, said switch matrix including: first AND gate means connected only between the column connected to the binary zero output of the Kth order flip-flop and the row designated as the binary zero of the Kth order flip-flop, where K is every integer less than N, second AND gate means connected only between the column connected, the binary one output of the Ith order flip-flop and the row designated as the binary one of the Ith order flip-flop, where I is every integer less than N, first OR gate means connected only between the column connected to the binary one input of the $(L+1)$th order flip-flop and the row designated as the binary one of the Lth flip-flop, where L is every integer less than N, and second OR gate means connected only between the column connected to the binary one input of the $(G+1)$th order flip-flop and the row designated as the binary one of the Gth flip-flop, where G is every integer less than N and the Nth order flip-flop is the zero order flip-flop.

29. The counter of claim 28 further including a clock pulse source, and means connecting said clock pulse source in parallel with each of said rows.

30. The counter of claim 28 wherein said AND and OR gate means all include only diode switching means, said AND gate means being shunt gates, said OR gate means being series gates.

31. The computer of claim 11 wherein said programmer includes N flip-flops, each of said flip-flops having a pair of complementary outputs and a pair of complementary inputs, said switch matrix having 4N columns of leads and 2N rows of leads, the first 2N said columns being connected to be responsive to signals deriving from said outputs, the other 2N of said columns coupling signals to said inputs, each of said columns being connected to a different one of said inputs and said outputs, said switch matrix further including: first gate means for selectively coupling and decoupling the first 2N of said columns to said rows, and second gate means for selectively coupling the decoupled ones of said rows to the second 2N of said columns, said first and second gate means being connected to said rows and columns in a predetermined manner to effect the program to be accomplished by the computer.

32. The computer of claim 31 wherein said first gate means comprises shunt AND gate means and said second gate means comprises series OR gate means.

33. The counter of claim 32 wherein said AND and OR gate means all include only diode switching means.

34. The computer of claim 32 further including a clock pulse source, and means for coupling the output of said clock pulse source in parallel with each of said rows.

35. A computer comprising a multi-word memory, a buffer register, an accumulator register, a programmer having a plurality of different states which are reached by a predetermined selective operations, said programmer including: a plurality of bistable devices, each of said devices having inputs and outputs, and a first switching matrix having inputs responsive to the outputs of said devices and outputs coupled to the inputs of said devices; a second switching matrix for selectively coupling a word in said memory to said buffer register in response to a first state of said programmer, a third switching matrix for coupling instruction and data words from said buffer register to said programmer in response to a second state of said programmer, said instruction words controlling the programmer operation selected, and a fourth switching matrix for selectively coupling words between said buffer register and said accumulator in response to at least one other programmer state, each of said switching matrices including rows and columns, several of the rows and columns of said switching matrices being directly connected together to form a composite matrix.

References Cited by the Examiner

UNITED STATES PATENTS

| | | | |
|---|---|---|---|
| 2,734,187 | 2/1956 | Rajchman | 340—174 |
| 2,840,728 | 6/1958 | Haugk et al. | 307—88.5 |
| 2,995,303 | 8/1961 | Collins | 235—176 |
| 3,054,988 | 9/1962 | Edwards et al. | 340—174 |

FOREIGN PATENTS

| | | |
|---|---|---|
| 1,155,167 | 10/1963 | Germany. |

ROBERT C. BAILEY, *Primary Examiner.*

MALCOLM A. MORRISON, *Examiner.*

M. A. LERNER, *Assistant Examiner.*